Figures 1, 2:
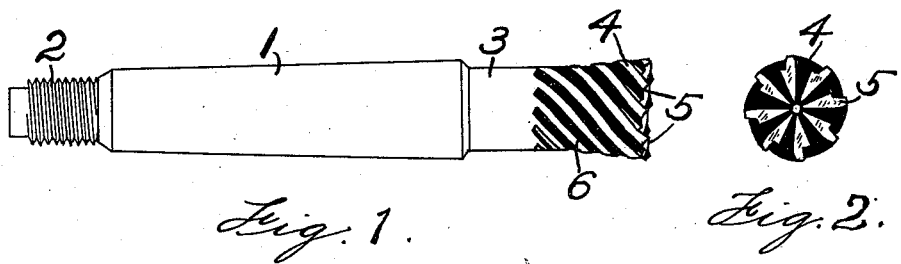

O. T. ANDERSON.
TOOL FOR CUTTING TEETH ON WORM WHEELS.
APPLICATION FILED FEB. 4, 1910.

1,023,353.

Patented Apr. 16, 1912.

WITNESSES:
H. B. Burr
WW Beal Jr

INVENTOR
Oscar T. Anderson
BY G. C. Kennedy
ATTORNEY

UNITED STATES PATENT OFFICE.

OSCAR T. ANDERSON, OF WATERLOO, IOWA.

TOOL FOR CUTTING TEETH ON WORM-WHEELS.

1,023,353. Specification of Letters Patent. Patented Apr. 16, 1912.

Application filed February 4, 1910. Serial No. 542,038.

*To all whom it may concern:*

Be it known that I, OSCAR T. ANDERSON, a citizen of the United States of America, and a resident of Waterloo, Blackhawk county, Iowa, have invented certain new and useful Improvements in Tools for Cutting Teeth on Worm-Wheels, of which the following is a specification.

My invention relates to improvements in tools for cutting teeth on worm-wheels, and the object of my improvement is to provide a tool for this purpose which can be operated at a tangent to the circumferential edge of the worm-wheel blank, and which is adapted to cut truly and accurately teeth thereon, as properly set for a determined number of such teeth thereon. This object I have accomplished by the means which are hereinafter described and claimed, and which is illustrated in the accompanying drawings, in which:

Figure 1 is a side elevation of the said cutting-tool. Fig. 2 is an elevation of the cutting-face of said cutting-tool shown in Fig. 1.

Similar numerals of reference designate corresponding parts throughout the several views.

The cutting-tool which is the subject of my invention has a shank 1, diminished conically at 3, and the diminished part 3 then expanded conically oppositely to form a cutter-head surrounded by spiral threads 4. The threaded head so formed diminishes in diameter from its cutting-face rearwardly or in a direction toward the shank 1, such lessening in dimensions being useful in affording a clearance over the edge of a worm-wheel disk blank while being cut.

The threads 4 terminate on the cutting-face of the tool abruptly to provide cutting angles 5 abutting upon the roots 6 of the threads. Suitable mechanism may be provided to hold said tool 1, while simultaneously rotating and advancing it forwardly, to cause its spiral threads 4 to advance tangentially upon the edge of the blank progressively to cut into it, while the blank is in rotation, the forming teeth on the blank moving between the side spirals 4 of the tool successively until the depth of such teeth is such that the roots 6 of the tool are reached, or, which is the same thing, the tool has fully excavated the roots of the worm-wheel blank teeth.

Since both the tool and the blank disk are to be actuated to have determined speeds of rotation relatively to each other the action of the tool is to exactly and speedily cut worm-teeth on the blank. The long spiral threads of the tool are by reason of this construction strong and free from liability to breakage.

Having described my invention, what I claim as new, and desire to secure by Letters Patent, is:

1. A tool for cutting teeth on worm-wheels, consisting of a rotary longitudinally-movable cutting-head provided with circumferential spiral threads running back from end cutting faces, said threads being progressively diminished in diameter in a direction running back from said cutting faces.

2. A tool for cutting teeth on worm-wheels, consisting of a spindle furnished with spiral threads extending from one end rearwardly, the cutting-end of each thread being approximately perpendicular to the axis of the spindle, and directed at an angle to the adjacent face of the next adjacent preceding thread.

3. A tool for cutting teeth on worm-wheels, consisting of a spindle furnished with spiral threads extending from its cutting end rearwardly, the threaded part of the spindle being widest at its cutting end and progressively diminishing in diameter rearwardly, the cutting end of each thread being set at an angle to the diameter of the spindle.

Signed at Waterloo, Iowa, this 19th day of Jan. 1910.

OSCAR T. ANDERSON.

Witnesses:
 G. C. KENNEDY,
 LETA CRABTREE.

Copies of this patent may be obtained for five cents each, by addressing the "Commissioner of Patents, Washington, D. C."